J. R. WOOD & D. C. EPRIGHT.
MOLDING MACHINE.
APPLICATION FILED APR. 14, 1913.

1,239,656.

Patented Sept. 11, 1917.
5 SHEETS—SHEET 2.

Witnesses:
E. B. Gilchrist.
R. L. Bruck.

Inventors:
John R. Wood and
D. Curtis Epright.
By Hull & Smith.
Attys.

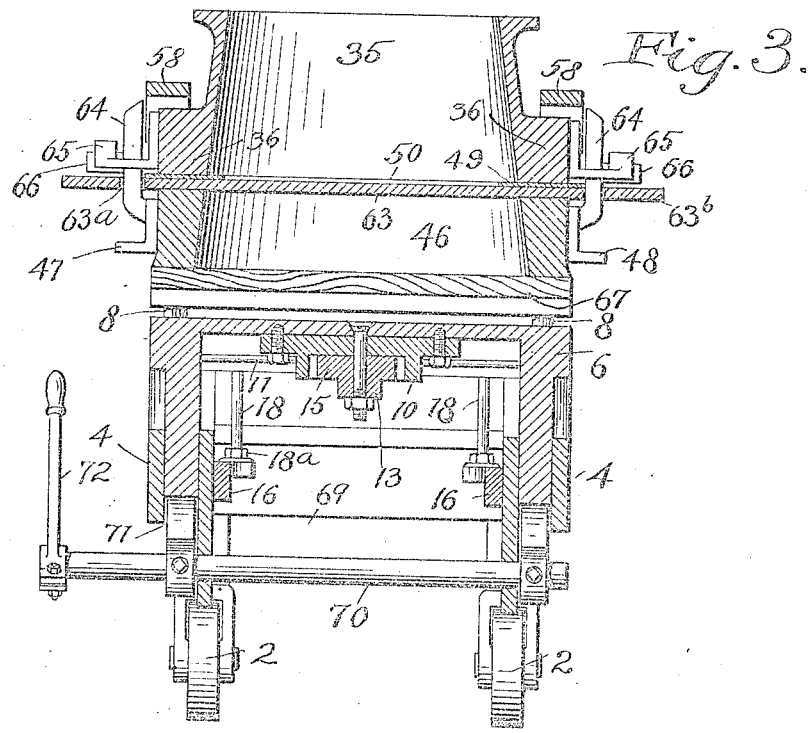
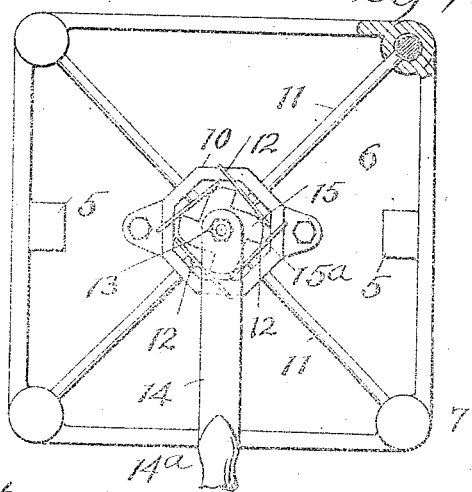
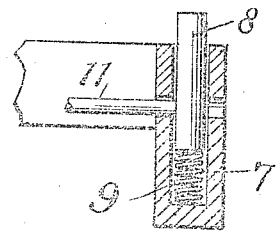

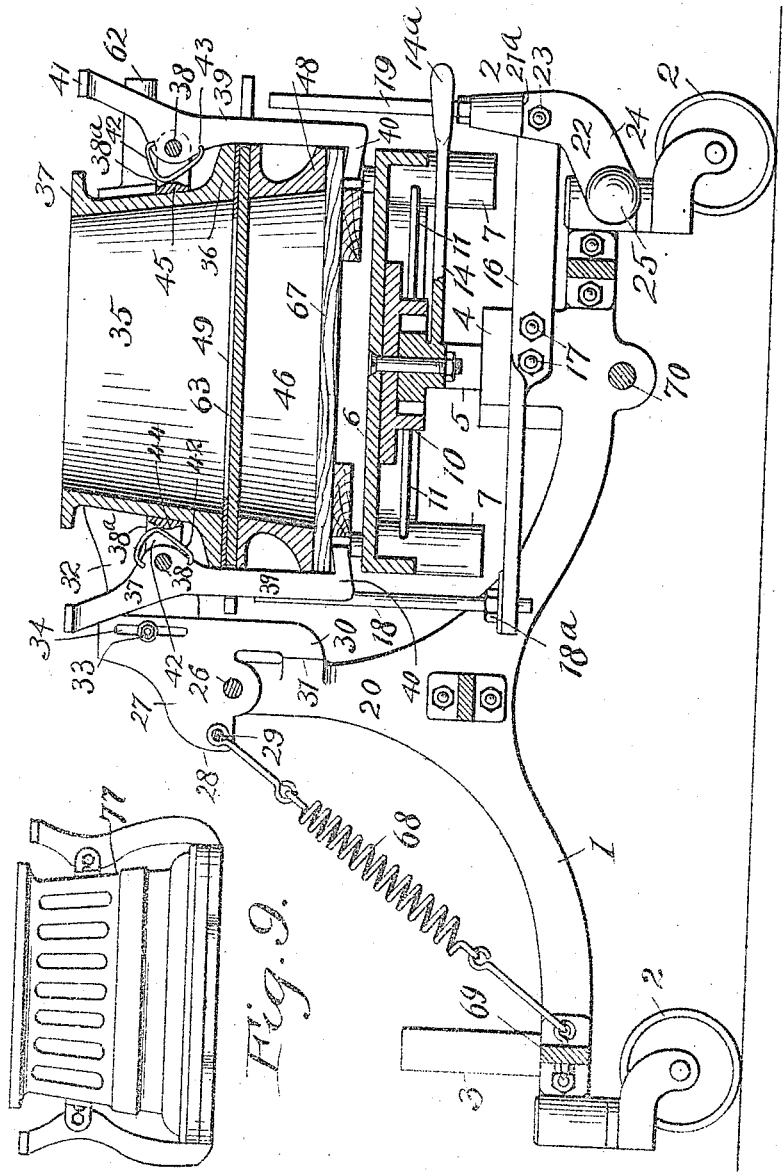

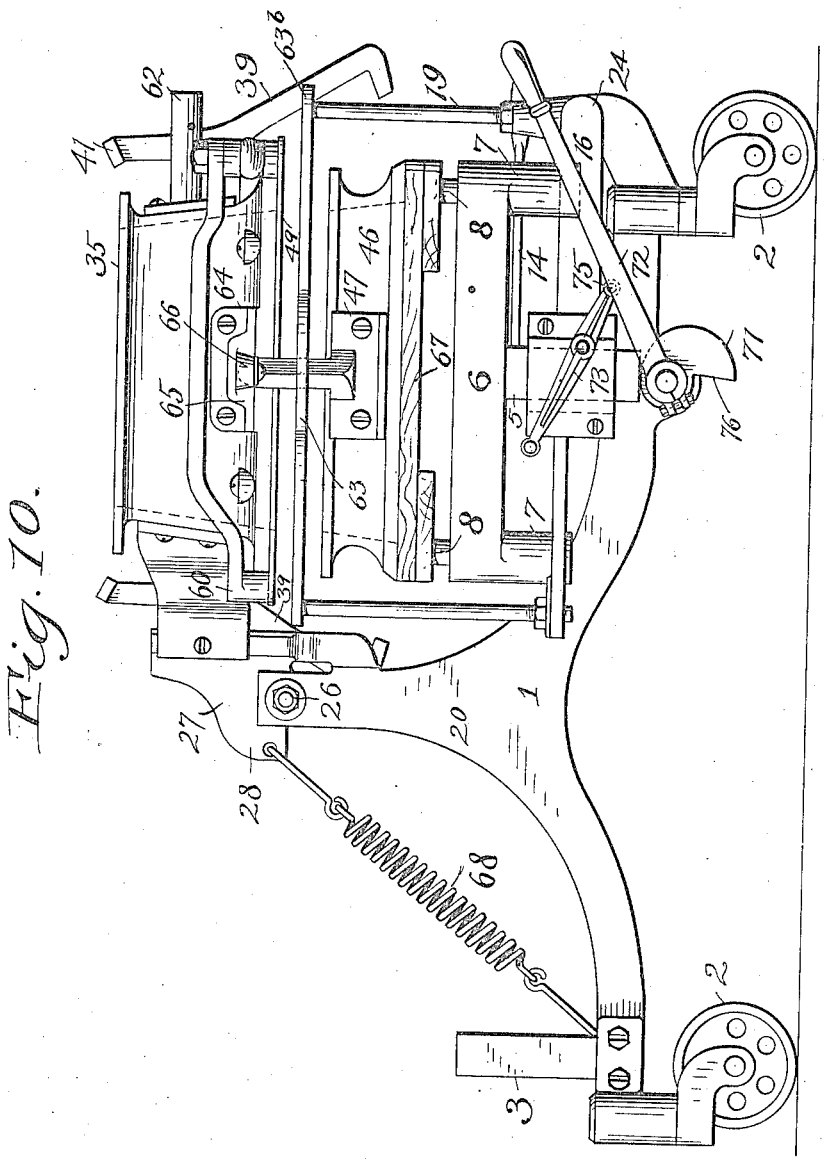

UNITED STATES PATENT OFFICE.

JOHN R. WOOD, OF NEWARK, NEW JERSEY, AND DANIEL CURTIS EPRIGHT, OF SPRING CITY, PENNSYLVANIA, ASSIGNORS, BY MESNE ASSIGNMENTS, TO ABRAM COX STOVE COMPANY, OF PHILADELPHIA, PENNSYLVANIA, A CORPORATION OF PENNSYLVANIA.

MOLDING-MACHINE.

1,239,656.      Specification of Letters Patent.      Patented Sept. 11, 1917.

Application filed April 14, 1913. Serial No. 760,955.

*To all whom it may concern:*

Be it known that we, (1) JOHN R. WOOD, (2) DANIEL CURTIS EPRIGHT, residing at (1) Newark, (2) Spring City, in the county of (1) Essex, (2) Chester and State of (1) New Jersey, (2) Pennsylvania, have invented a certain new and useful Improvement in Molding-Machines, of which the following is a full, clear, and exact description, reference being had to the accompanying drawings.

Figure 1:
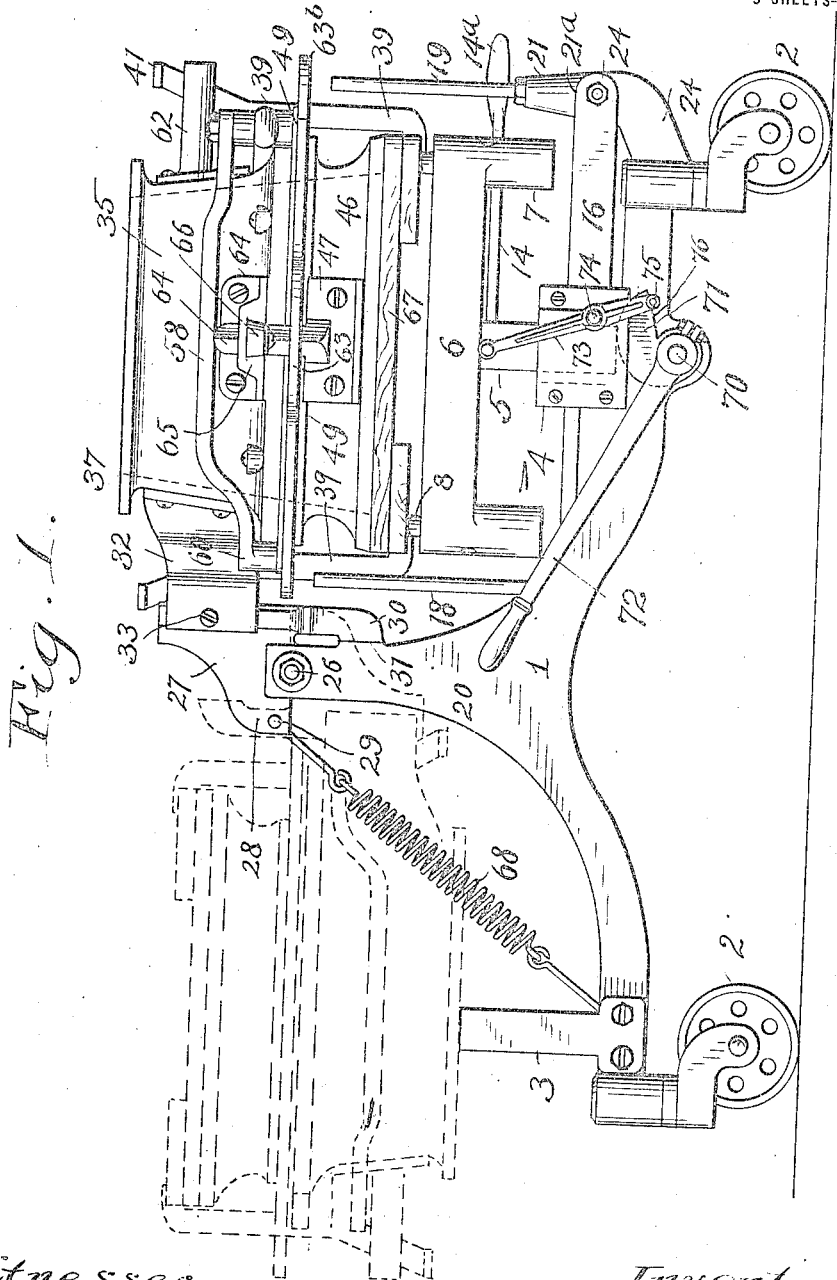
Figure 2:
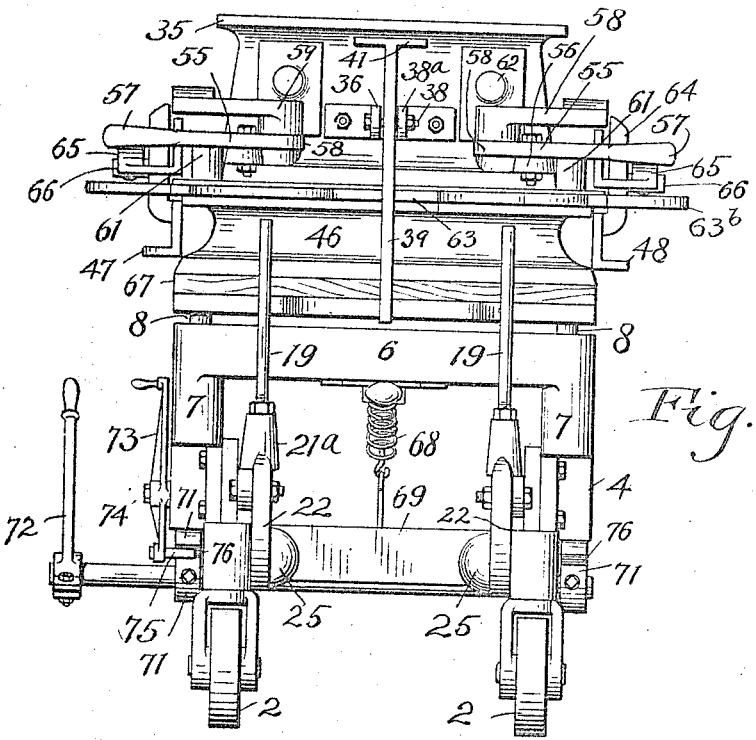
Figure 5:
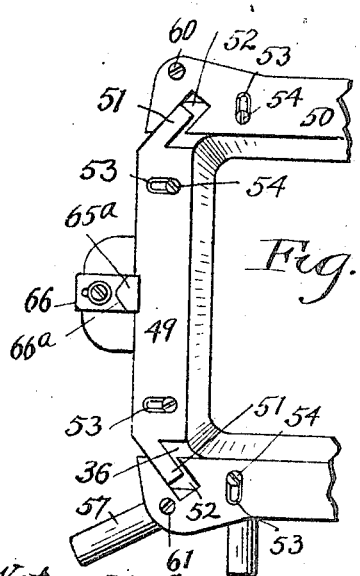
Figure 6:
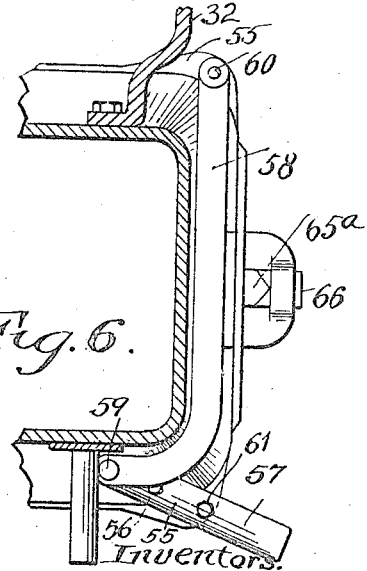

This invention relates to molding machines and more particularly to the means for detachably connecting the flask sections of such machine, the invention being applied to a machine of the "rock-over" type shown in the drawings hereof, wherein Figure 1 represents a side elevation of a molding machine constructed in accordance with our invention; Fig. 2 an end elevation of the machine, the end chosen being the one shown at the right hand of Fig. 1; Fig. 3 a vertical sectional view taken through the flask and the supporting platform of the machine; Fig. 4 a longitudinal vertical sectional view through the machine; Fig. 5 a fragmentary plan and Fig. 6 a fragmentary sectional view of the cope, showing the construction of the sand-retaining device and the operating means therefor; Fig. 7 a bottom plan view of the leveling platform; Fig. 8 a vertical sectional detail through one of the corner posts of said platform; Fig. 9 an elevation of one of the mold shells or casings; and Fig. 10 a side elevation of the machine showing the manner of separating the cope and drag preliminarily to the removal of the match plate.

In the embodiment of our invention illustrated and disclosed herein, there is provided a supporting base which, for convenience of manipulation, may constitute part of a truck or carriage having at one end thereof a platform with means for adjusting and leveling the same and at the other end thereof a support for the cope and the drag, there being vertical standards interposed substantially midway between such ends; means pivotally connecting the cope to said standards whereby it is allowed to rock from one end to the other of the base; retaining means (such as hooks) for securing the drag and its bottom plate to the cope, whereby the complete flask may be rocked from one end support of the base to the other; means for separating the drag and cope after the ramming operation, to permit the removal of the match plate; and sand retaining and disengaging means connected with the cope for supporting the rammed sand until after the removal of the match plate and thereupon permitting it to be dropped into contact with the rammed sand in the drag. Other details of construction will appear hereinafter.

Describing by reference characters the various parts illustrated herein, 1 denotes generally the base of the machine, said base in the embodiment shown herein comprising a pair of longitudinal side members connected to form a frame, the base having casters 2 thereon whereby it may be transported from place to place as a truck. Each side member is provided at one end thereof with a vertical post 3, which posts are adapted to engage the cope when the cope, either alone or with the drag attached thereto, is folded over, as indicated in Fig. 1. The opposite ends of the side members are provided each with a vertical guideway 4, said guideways being adapted to receive the posts 5 of a vertically adjustable platform 6. This platform is provided at each corner with a depending tubular boss 7, and mounted in each tubular boss is a short post 8, each post being supported by means of a spring 9 in the bottom of the boss. For the purpose of locking these posts at any desired level, we have provided a construction shown more particularly in Figs. 3, 4, 7, and 8. In this construction 10 denotes a hub or collar which projects downwardly beneath the central portion of the bottom of the platform 6, and 11 a series of rods, one for each hollow boss 7, each rod having one end projected into the boss and its other end projected into the interior of the hub or collar 10. A series of flat springs 12 is provided, one for the inner end of each rod 11, the springs being conveniently secured in place by insertion through slots in the hub 10. 13 denotes a stud which is centrally mounted within the hub and on which is journaled the inner end of a lever 14. This lever carries, preferably as an integral part thereof, a series of cams 15, one for each spring 12. The lever is provided with an operating handle 14ª. By moving the lever in the appropriate direction, the cams 15 will engage the springs 12 and press the rods 11 outwardly and into engagement with the posts 8, whereby said posts may be retained in any desired adjusted position. In order to retain the rods 11 in their outwardly projected position, each cam may be provided with a dwell 15ª concentric with the pivotal support 13, whereby the lever will be retained in position to keep the rods 11 thrust outwardly into engagement with the posts 8.

16 denotes a pair of longitudinally extending members which may be conveniently supported from the guides 4, as by means of bolts 17. These longitudinally extending members form a supporting base for the vertically extending rods 18 and 19, the rods 18 being located at one side of and near the central standards 20 and the rods 19 being located at the opposite ends of the members 16. The rods 18 are vertically adjustable, as by being threaded into their respective supporting members 16, lock nuts 18ª being provided to secure the rods in adjusted position. The rods 19 are pivotally supported from the ends of the members 16, their lower ends being threaded into tubular bosses 21 carried at the upper ends of angular arms 22. Each of these arms is pivotally supported and has an inwardly directed end portion 24 which may be weighted, as shown at 25, whereby the rods 19 will be moved inwardly (that is, toward the center of the truck) by gravity. To prevent these rods from moving beyond a vertical position, the bosses 21 are provided with shoulders 21ª which are adapted to engage their respective supporting members 16 to prevent such movement (see Fig. 1).

Reference has been made to the vertical standards 20, located intermediate of the ends of the truck frame. These standards form journals for a shaft 26. This shaft provides a pivot for the rock-over frame to which the cope is secured. The rock-over frame comprises generally a pair of brackets 27, which are preferably rigid with the shaft. Each bracket is provided with a lateral projection 28 at one side of the pivot thereof, there being a rod 29 extending between said projections; also with a projection 30 which, when the frame is rocked on one side of the standards, is adapted to engage a projection 31 on the appropriate standard, to limit the swinging movement of the flask or the cope thereof. The cope is connected to these brackets by means of arms 32 which are rigid with the cope and have their ends adjustably connected with that portion of the bracket which is opposite the projection 30. This connection is accomplished by means of a pin or bolt 33 carried by each arm 32 and projecting through a slot 34 in the bracket.

The cope, which is supported by the arms 32, is designated generally by the numeral 35. This cope is shown as frusto-pyramidal in shape and is provided at its opposite ends with outwardly projecting flanges 36 and 37. Pivoted to pins 38 carried by lugs 38ª projecting from opposite sides of the cope are latches 39. These latches are each provided at one end with an inwardly projecting portion 40, for a purpose to be described, and at the opposite end with an operating extension or handle 41. Each latch is preferably provided with a bowed spring 42 which may be conveniently applied to the latch by inserting the ends 43 thereof into slots located on opposite sides of the pivot of each latch. Each spring 42 has a pair of oppositely inclined surfaces which are adapted to coöperate with the oppositely inclined surfaces 44 of a projection carried by the cope in such manner that the latch will be retained in locking or engaging position and in open or disengaging position, accordingly as one or the other of the inclined surfaces of its spring 42 is in engagement with one or the other of the inclines 44 of the projection 45. The construction affords convenient yielding means for retaining the latches in either of these two positions and for permitting the latches to be swung easily from one position to the other.

The purpose of the latches 39 is to suspend the drag and bottom board of the flask from the cope and to permit the convenient removal of the drag and bottom board when occasion requires. Through the use of these latches, the flask is pivotally supported, either in whole or in part, from the standards 20.

The drag of the flask is represented at 46 and is also frusto-pyramidal in shape, constituting in effect a symmetrical extension of the cope. It is provided at its contracted end with an outwardly projecting flange 47 and at its opposite end with a similar flange 48. For convenience of description, the enlarged ends of the cope, drag and flask will be referred to as the "bottom" thereof while the contracted ends will be referred to as the "top" thereof.

At its bottom or lower end, the cope is provided with an adjustable sand-retaining device, the purpose of which is to temporarily support the rammed or compacted sand in the cope during the removal of the match plate and to permit such sand to drop onto the rammed or compacted sand in the drag when the match plate is removed. The construction of this retaining device will now be explained in connection with Figs. 1, 2, 4, 5, and 6. The sand retaining device is made up of a plurality of interengaging segments 49, 50. These segments are preferably in the shape of flat plates which are slidably mounted upon the bottom face of the cope 36. The plates 49, in the construction illustrated, are mounted on opposite sides of the cope flange 36 and are each provided at opposite ends thereof with inclined projections 51. The plates 50 are also opposed to each other and are provided with inclined slots 52. The opposite sides of the projections 51 are substantially parallel, as is the case with the opposite sides of the slots 52. The plates 49 and 50 are adapted to slide toward and from the interior of the cope by means of slots 53 therein through which pass the headed pins or screws 54, carried by the cope flange 36. For the purpose of so moving the sand-retaining plates, the following construction is provided:—55 denotes a pair of operating levers, each shown as pivoted intermediate of its ends on a lug 56 carried by the cope. One end of the lever is provided with an operating handle 57 and its opposite end is connected to a link 58, as indicated at 59. The opposite end of the link is connected to one of the corners of the plate 50 on the opposite side of the cope from the said lever, the point of connection being indicated at 60. At the same distance from the pivot 56 as the point of connection 59, the lever 55 is also connected to the plate 50 which is on the same side of the cope as said lever, the point of connection being indicated at 61. Identically the same construction and connections are provided at the opposite end of the cope flange from the parts just described, similar numerals 55—61 being employed to designate these parts. By the construction described, it will be apparent that the plates 50 may be moved inwardly or toward the center of the cope by the levers and that the outer inclined edges of the slots 52 will act upon the outer edges of the inclined projections 51 to move the plates 49 inwardly, with the result that the plates 49 and 50 will project inwardly within the interior of the bottom of the cope to provide a retaining shelf for the compacted sand, the position of the parts at this time being shown in Figs. 3 and 4. It will be evident that, by moving the lever handles 57 in the reverse direction, the inner inclined edges of the slots 52 will engage the correspondingly inclined inner edges of the projections 51 as the plates 50 are moved outwardly, with the result that the sand retaining device will be moved outwardly to clear the inner bottom edge of the cope and permit the sand to drop, the positions of the parts at this time being shown in Fig. 5.

The cope will be provided with one or more operating handles 62 for convenience of swinging it and the parts attached thereto about its pivotal support.

The principal field of use of the flask will be in connection with a match plate, which may be inserted between the cope and drag and removed therefrom after the ramming operation. Such a match plate is indicated at 63. For the purpose of properly alining the cope, drag, and match plate, the drag is provided with a pair of upwardly projecting posts 64, located on opposite sides thereof, and the cope is provided with a pair of lateral projections 65, each having an aperture adapted to receive the appropriate post, to aline the cope and drag. The posts are preferably triangular in outline and the projections 65 are provided with similar guide recesses 65ª which may be conveniently formed by slotting said projections and adjustably fitting each slot with a block 66 having its inner end provided with inclined faces 66ª which define the outer periphery of and complete the guide aperture 65ª. The match plate 63 will be provided with apertures 63ª which are adapted to receive the posts 64 and thereby center the plate with reference to the flask. The bottom of the drag is provided with a bottom board 67 which is adapted to be engaged by the inner ends 40 of the latches 39, to retain the sand within the flask when the parts are in the position shown in Figs. 1 to 4 inclusive.

Reference has been made to the rod 29. A spring 68 is connected at one end to this rod and at its other end to a cross bar 69. The purpose of this spring is to minimize the jarring of the flask by its impact against the posts 3 and 8, according as it is swung from one side to the other of the supporting standards 20.

Coöperating with the posts 5, for a purpose to be explained hereinafter, is a shaft 70 having a pair of cams 71 thereon, the shaft 70 being journaled in the bottom of the side frames 1 and having an operating lever 72 rigid therewith. The cams are adapted to engage the bottoms of the posts 5 and, as the lever 72 is rocked downwardly (see Fig. 1), the cams will engage and elevate the posts 5 and thereby elevate the platform and the parts supported thereby. The cams are so arranged as to engage the bottoms of the posts 5 at one side of the vertical plane passing through the axis of the shaft 70, whereby there will be a tendency to rock the shaft by the downward thrust of the parts supported by the cams. To prevent such rocking of the parts, a gravity latch is provided which is adapted to engage the under surface of one of the cams to thereby retain the parts in the position shown in Fig. 1. This latch consists of a lever 73 which is pivoted intermediate of its ends, as indicated at 74, and has at its lower end an inwardly projecting arm 75 which is adapted to drop by gravity beneath the lower surface 76 of the cam when the shaft is rotated a sufficient distance in a direction to elevate the platform. When it is desired to lower the platform, it is only necessary to rock the lever so as to disengage its arm 75 from the under surface of the cam.

With the parts constructed as illustrated and described, the operation will be as follows:—The flask, with the bottom board 67 removed, will be folded over to the position shown in dotted lines in Fig. 1, the flange 37 of the cope resting upon the posts 3. The drag will be filled and rammed while the parts are in this position. the bottom board 67 will be applied and the latches 39 swung inwardly so that the hooked ends 40 thereof will engage the bottom board and retain the same in place. The flask will then be rocked over to the opposite side of the standards 20, the botttom board engaging the posts 8 carried by the platform 6. When the flask is properly leveled by these posts, the posts may be locked in proper position by means of the lever 14, in the manner heretofore described. Observing that the sand retaining plates are in their "inward" position, so as to form a shelf, the cope is then filled and rammed in the usual manner. It will be observed that, in this position, the corners 63ᵇ of the match plate overhang the posts 18 and 19 and are spaced therefrom a sufficient distance to insure clearance. The upper ends 41 of the latches 39 are moved inwardly, disengaging the hooked lower ends from the bottom board 67 and breaking the suspension between the cope and the drag. The construction and arrangement of the springs 42 and projections 45 retains the latches in this unlocked position. The operator then disengages the lever arm 75 from the cam and moves the lever 72 upwardly, thereby lowering the platform 6 and the drag which is supported thereby, the cope meanwhile being supported by the engagement of the bracket projections 30 with the projections 31 (see Figs. 1 and 10). The match plate 49 follows the drag until the corners 49ᵃ engage the upper ends of the posts 18 and 19. Further movement of the lever 72 will lower the platform and the drag a sufficient distance to provide clearance between the match plate and the drag (see Fig. 10). With the cope and drag thus separated from each other and from the match plate, the cope may be swung upwardly about its pivot a sufficient distance to enable the match plate to be lifted off from the posts 64. The cope 55 is then swung back to its position above the drag. The lever 72 is then rocked to the left to move the platform upwardly and bring the upper surface of the drag into engagement with the lower surface of the cope. The levers 55 are then operated to move the sand-retaining plates 49 and 50 outwardly, leaving the rammed sand in the cope supported by the rammed sand in the drag. The cope may then be swung to the other side of the suppotring standards 20, the angle of incliniation given to its walls being such as to enable it to clear the molded sand. The drag part of the flask is then removed, and the completed mold and bottom board is ready for removal from the platform 6. Should the parts encounter the posts 19; the manner of pivotally supporting these posts enables them to swing outwardly freely whereby the removal of the drag and the molded sand will not be interfered with. The completed mold may then be placed upon the floor ready for the retaining casing or shell 77 and the drag returned to the machine and the parts be assembled ready for the next operation.

Having thus described our invention what we claim is:—

The combination of a pair of flask sections, a bottom board for one of said sections, latches pivoted to the other section and having means adapted to engage and retain the bottom board, a spring connected to each of the latches and having oppositely inclined portions arranged on opposite sides of its pivot, and a projection having oppositely inclined faces coöperating with the inclined portions of each spring.

In testimony whereof, we hereunto affix our signatures in the presence of two witnesses.

JOHN R. WOOD.
DANIEL CURTIS EPRIGHT.

Witnesses:
 NICKOLAS BEISHEIM,
 WILLIAM J. REINER.